United States Patent [19]

Zitting

[11] 4,190,259

[45] Feb. 26, 1980

[54] SINGLE APEX TWO ELEMENT FLUID PRESSURE SEAL ASSEMBLY

[75] Inventor: Gordon T. Zitting, Sandy, Utah

[73] Assignee: Microdot Mfg., Inc., Salt Lake City, Utah

[21] Appl. No.: 940,534

[22] Filed: Sep. 8, 1978

[51] Int. Cl.² .......................... F16J 9/00; F16J 15/24
[52] U.S. Cl. .................................................. 277/165
[58] Field of Search ............................... 277/165, 213

[56] References Cited

U.S. PATENT DOCUMENTS

| Re. 28,105 | 8/1974 | Traub | 277/165 |
| 3,614,114 | 10/1971 | Traub | 277/165 |

*Primary Examiner*—Robert I. Smith
*Attorney, Agent, or Firm*—Lynn G. Foster

[57] ABSTRACT

A two element, high and low pressure seal assembly to be used in a hydraulic or pneumatic sealing environment between two relatively movable machine parts, the seal assembly comprising an anti-extrusion spring element illustrated as generally rectangular in cross-section but including a projecting annular tongue and made of a relatively soft elastomeric material, the projecting tongue of said spring element contiguously engaging the entire surface of the base with the annular tongue being contained within an annular slot of a U-shaped elastomeric annular sealing member whereby the two member assembly functions jointly, and accommodates easy installation. The mating interface between the parts assure reliable unitary response but simultaneously provides a flex site at said interface which yieldingly resists imposed forces without fluid leakage. The U-shaped sealing element comprises a central body from which two anti-extrusion legs radially extend. The legs are located fore and aft of the tongue element within an annular peripheral groove in one machine part and are disposed perpendicularly or radially to the axis of said machine part. Projecting radially beyond said machine part is a convergingly tapered surface defining a central vertex or apex, said vertex creating a narrow contact dynamic seal area between the apex per se and the second machine part when the seal assembly is in said machine part groove and compressed between the two machine parts. The sealing member may project either radially inwardly or radially outwardly from the spring element. The axial dimension of the entire seal assembly is slightly smaller than the axial dimension of the machine groove thereby creating the mentioned dynamic narrow seal area between the apex of the sealing element and the second machine part, one static seal between the base of the anti-extrusion spring element and the base of the groove and between one radially directed sidewall of the machine groove and the contiguous anti-extrusion leg of the sealing element and one side wall of the spring element.

7 Claims, 5 Drawing Figures

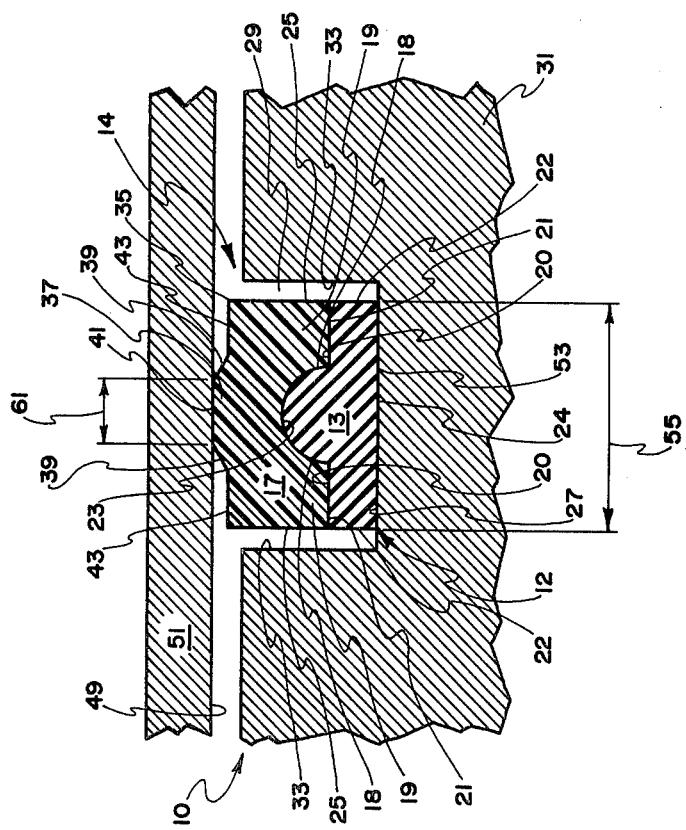
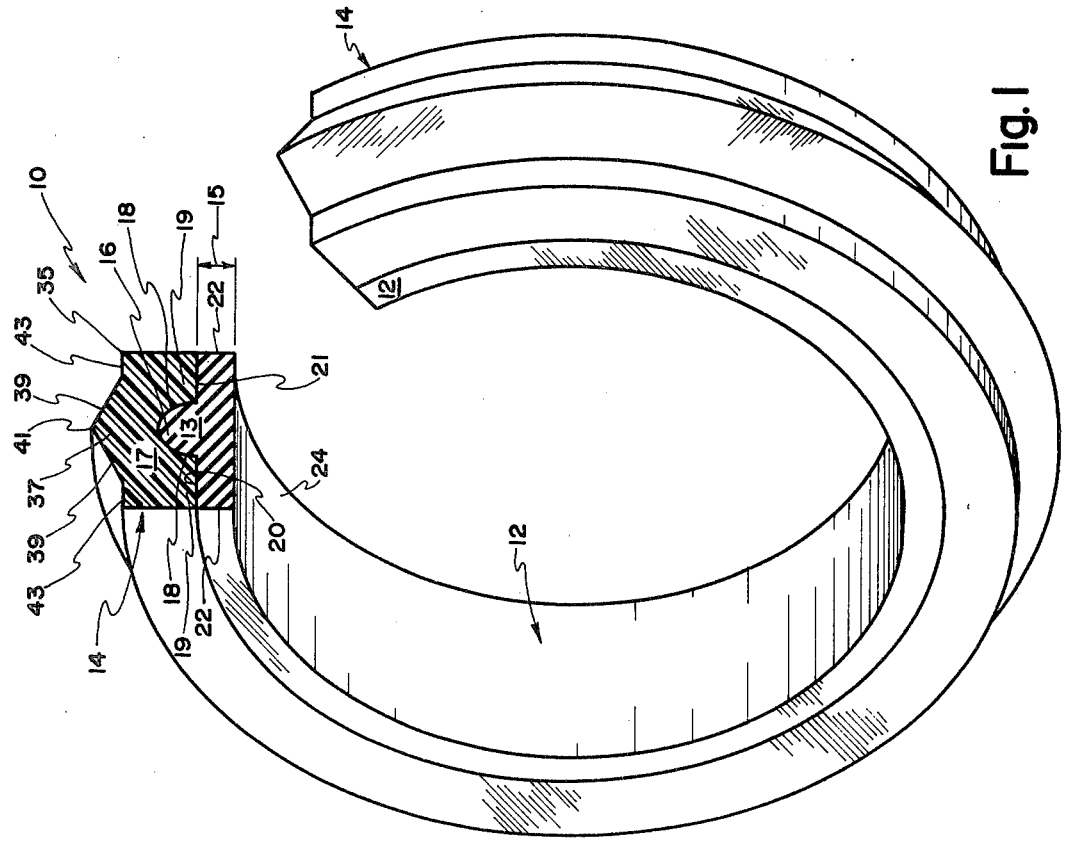
Fig. 3
Fig. 1

SINGLE APEX TWO ELEMENT FLUID PRESSURE SEAL ASSEMBLY

BACKGROUND

1. Field of the Invention

This invention relates generally to hydraulic seals and more particularly to a novel single apex full width two element high and low pressure seal assembly.

2. Prior Art

In the past, it has been common to provide two or more part seals for hydraulic and pneumatic use wherein the seal assembly is placed in a standard groove of one machine part to project toward and engage a second relatively movable machine part, the object being to prevent fluid displacement across such sites. The use of such multi-part seal assemblies of the prior art has often resulted in misorientation, twisting and extrusion of the yieldable sealing element so that the initial fluid-tight relationship is lost. Thus, such prior art proposals have regularly experienced seal failure because of lack of resistance to pressures imposed upon the seal. Wide contact dynamic seal areas proposed in the past provide at best limited pressure resistance to fluid displacement across the seal and at the same time cause an increase in frictional resistance to displacement of the two machine parts. These types of seal assembly configurations commonly permit an unacceptably high level of fluid leakage across the seal site.

In addition, specially configurated and expensive machine part grooves and seal assembly components are frequently required. Often, a plurality of seals or a plurality of seal assemblies or a plurality of dynamic seal areas are required between machine parts, which introduce complexity and cost factors which make production prohibitive. Many such prior art seal proposals commonly loosen with wear and often the two elements of the seal assembly are relatively instable one in respect to the other. Thus, each of the two seal members will displace relative to the other during use.

Examples of broad seals which result in limited resistance to fluid displacement with increased friction and wear and across which leakage often occurs, sometimes at high pressures and nearly always at low pressures are U.S. Pat. Nos. 3,636,824; 3,149,848; and 3,418,001. The first mentioned patent also is an example of plural seal assemblies being required between machine parts. U.S. Pat. No. 3,268,235 is an example of requiring a plurality of spaced sealing surfaces, interrupted in each instance by a groove.

Examples of instability between the two seal elements of the seal assembly are found in U.S. Pat. Nos. 3,328,041; 2,931,673; Re 24,440; 3,663,024 and 2,877,070. U.S. Pat. No. 3,418,001 also comprises a two-part seal assembly where the two parts do not work substantially in unison but rather may be independently displaced. U.S. Pat. No. 3,663,024 also illustrates a spring-loaded triangular seal, where the two parts thereof are allowed to respond during use substantially independent of each other.

In addition, it has sometimes been proposed that the sealing element be supported not only by the second element but also upon shoulders in the one machine part directly adjacent to the machine groove. See U.S. Pat. No. 3,814,445. Further, somtimes unusually configurated grooves possessing special structural characteristics for retaining the seal assembly have been proposed. See U.S. Pat. No. 2,915,349.

BRIEF SUMMARY AND OBJECTS OF THE PRESENT INVENTION

The present invention comprises a single apex, two element high and low pressure seal assembly comprising a relatively soft elastomeric annular spring element which acts to urge a relatively hard elastomeric sealing element into a compressed, high resistant pressure, narrow band, stable dynamic sealing engagement. The elastomeric sealing element is annular in configuration and has legs spaced resting upon shoulders of the spring element the legs enveloping within the hollow interior therebetween the annular tongue projection centered between the shoulders. This contiguous engagement of sealing and spring elements is for unitary installation and unitary response during use. The shoulder and tongue in groove interface between the spring and sealing member providing a flex site which yieldingly resists imposed forces without fluid leakage. The base of the spring element creates a static seal by engagement with the base of a groove in a first machine part. The machine groove comprises normally not only an annular flat base but spaced parallel radially directed sidewall surfaces. The exterior surface of each of the two anti-extrusion legs are parallel to each other and to the radially directed sidewalls of the machine groove. The exterior vertical sidewalls of the spring element are parallel to each other and are flush with the exterior surface of said anti-extrusion legs thereby creating one smooth composite surface. The seal assembly defines a cumulative axial seal dimension slightly less than the axial dimension of the machine groove. Accordingly, under pressure, an anti-extrusion seal area is created between the radial wall of the groove opposite the pressure and the contiguous exterior surfaces of the flush sealing member leg and the spring member. A delta-shaped projection comprising sloped side surfaces and an apex centrally disposed extends from the body of the sealing member away from the groove of the one machine part into compressed, load resistant, dynamically sealed interface contact with a very narrow ribbon or band area of a relatively movable second machine part. Each sloped side surface of the delta-shaped projection preferably merges into an annular flat exposed shoulder spaced from but substantially parallel to the base of the machine groove which in turn may merge at substantially ninety degrees (90°) with an exposed heel of the exterior surface of the adjacent anti-extrusion leg.

With the foregoing in mind, it is a primary object of the present invention to provide a novel high and low pressure, efficient, two element sealing assembly.

A further important object of the present invention is to provide a unique annular, two element seal assembly comprising a U-shaped, single apex, restricted contact sealing element and a spring element having a tongue located within the U of the sealing element and shoulders against which the ends of the legs of the sealing member contiguously engage, which elements function in unison as a compression or squeeze-type seal assembly with the interface between the members defining a flex site which yieldingly resists force without fluid leakage.

It is a further paramount object of the present invention to provide a novel two element seal assembly comprising a full width spring element and a sealing element having a delta-shaped projection by which a narrow band or line seal is created with an opposed machine part.

An additional dominant object of the present invention is the provision of a novel two element seal assembly having a unitary male/female relationship, the sealing member having anti-extrusion legs straddling a circular tongue projection of the spring element, the terminal ends of said legs contiguously engaging annular shoulders of the spring member on either side of said projection.

A further primary object is the provision of a novel two element seal assembly comprising a relatively soft elastomeric full width spring element and a relatively hard or wear compensating elastomeric sealing element which firmly but narrowly engages a relatively moving machine part.

A further significant object according to the present invention is the provision of a novel two element seal assembly by which a single narrow dynamic seal area is created between the sealing element and a relatively movable machine part, an anti-extrusion seal area is jointly created between an anti-extrusion leg of the sealing element abutting a vertical side wall of the annular spring element and a groove wall of a second machine part and a static seal area is created between the spring element of the seal assembly and the base of the machine groove.

An additional object of significance is the provision of a novel two element seal assembly where the sealing element and spring element function in flexible unison within a machine groove, the axial dimension of which is slightly greater than the axial dimension of the seal assembly.

A further significant object of the invention is the provision of a U-shaped annular sealing member having full width support and comprising a single delta-shaped apex projecting beyond one machine part into compressed sealing engagement with another machine part along a narrow interference region, creating a high unit pressure resistance at said region to obviate seal failure, fluid leakage across the seal and minimizing wear and its effects.

A further important object is the provision of a novel two element seal assembly which can be used in connection with and is resistant to all petroleum, water-glycol, water-oil and other emulsions as well as hydraulic fluids having temperatures within the operating range of $-90°$ F. to $+500°$ F.

It is a further important object of the present invention to provide a novel two element seal which is resistant to phosphate ester and other synthetic fluids.

A further important object is the provision of a novel two element seal which will not fail or permit fluid leakage thereacross when exposed to pressures ranging from vacuum to over 10,000 pounds per square inch and in environments which are abrasive, wet or chemically corrosive.

These and other objects and features of the present invention will be apparent from the detailed description taken with reference to the accompanying drawings.

BRIEF DESCRIPTION OF THE DRAWINGS

FIG. 1 is a perspective representation of one presently preferred two element seal assembly embodiment according to the present invention with a portion thereof broken away to increase clarity;

FIG. 3 is a cross-sectional representation similar to FIG. 2 but with the two element seal assembly and piston placed within the cylinder;

DETAILED DESCRIPTION OF THE ILLUSTRATED EMBODIMENTS

Figure 4:
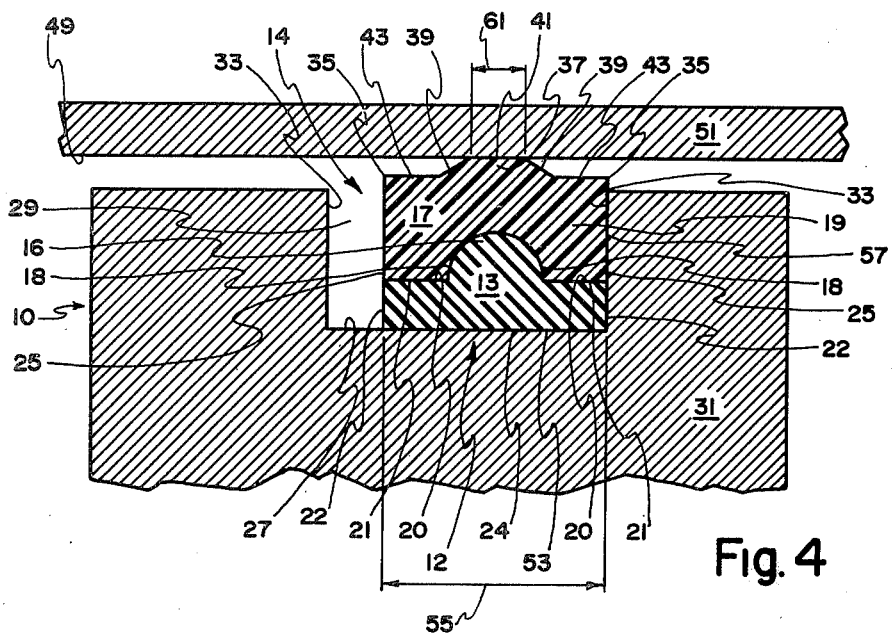
FIG. 4 is an enlarged fragmentary cross-sectional representation illustrating the one dynamic, one anti-extrusion and one static seal areas created when the seal is disposed as indicated in FIG. 3 and subjected to pressure.
Figure 5:
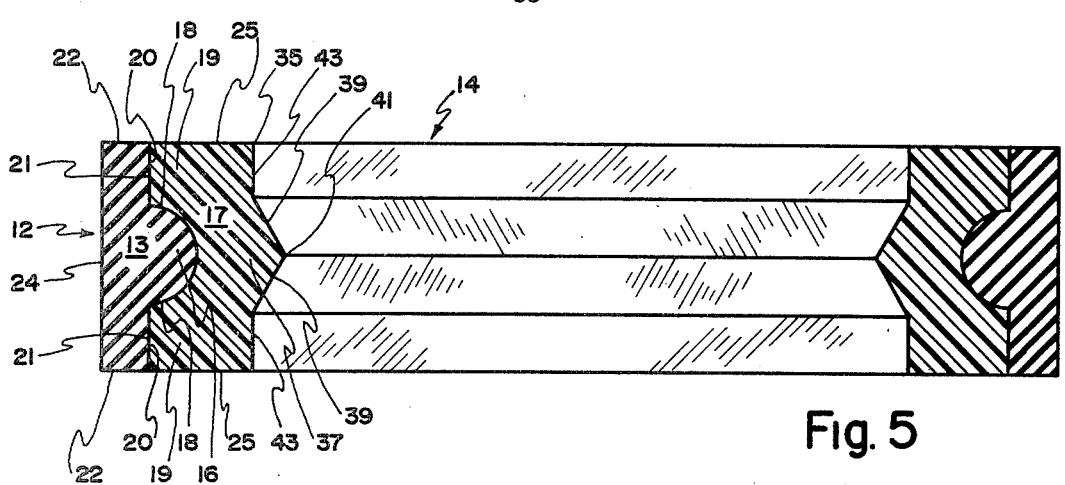
FIG. 5 is a cross-sectional representation of a second preferred two element seal assembly according to the present invention.

Reference is now made to the drawings wherein like numerals are used to designate like parts throughout. FIG. 1 in particular depicts, in an unstressed condition, a presently preferred two element, high and low pressure seal assembly according to the present invention, which is generally designated 10. The seal assembly 10 comprises a resilient and yieldable spring element 12, illustrated as being generally flat and rectangular with a centered generally in cross-section circular annular tongue projection along one longitudinal side of said rectangle and being formed of a relatively soft elastomeric material and a sealing element 14 which is generally U-shaped in cross-sectional configuration so as to straddle and encapsulate said circular tongue projection the terminal ends of the U-shape being in contiguous engagement with annular shoulders on either side of said projection on the longitudinal surface of the spring element 12 upon which said projection is disposed, the sealing element 14 being formed of a relatively hard, tough and low wear elastomeric material. While the seal 10 is illustrated as being unitarily disposed in a groove of a piston or ram (see FIGS. 2-4), it is to be appreciated that other types of installation apply, e.g. the components can be fabricated in reverse orientation (as illustrated in FIG. 5) and used, for example, in a groove disposed at the interior wall of a cylinder in which a piston or ram reciprocates.

The spring element 12 as mentioned is illustrated as being substantially flat and rectangular in cross-section with a centered generally circular projection 16 having an annular tongue along one longitudinal surface of said rectangle. The circular tongue portion 16 comprises somewhat straight sides 18 which sides 18 extend radially away from a rectangular annular body 13 comprising the spring element 12. The sides 18 of the projection 16 respectively merge with two spaced aligned annular shoulders 20. An arcuate surface 23 joins sides 18. The spaced vertical sidewalls 22 of spring element 12 are radially disposed and parallel to each other. Said sidewalls 22, are perpendicularly joined to the annular base 24. Base 24 is relatively wide. Spring element 12 may, for example, be formed of a suitable synthetic resinous or other satisfactory elastomeric material. Thus, the spring element 12 is relatively soft and readily resilient and yieldable. For purposes of creating a broad static seal with the base of a machine groove, in a manner hereinafter more fully described, the transverse dimensions of the spring element 12 are selected so that tongue 16 of element 12 is received within an interior annular slot of the sealing element 14 and radially projects a relatively short distance 15 toward the base of the groove beyond the limits of the sealing member 14.

The sealing member 14, as mentioned, is generally U-shaped and comprises a central body 17 from which two narrow annular anti-extrusion legs 19 radially project. The legs 19 are of uniform width from the adjacent mid-point of the spring element 12 to the two terminal butt ends 21. The legs 19 beginning adjacent said mid-point of the spring member 12 arcuately merge along an arch 23 into the body 17. The diameter of the arch 23 may be substantially the same as the diameter of the circular tongue projection 16 of said spring element 12. Thus, the circular projection 16 of said spring element 12 will snugly fit within and create a saddle between the legs 19 contiguous with arch 23 and also project via the remaining flat rectangular annulus 12 in an unstressed state through the distance 15 beyond the butt annular ends 21 of said legs 19.

The opposed exterior surfaces 25 of the legs 19 are radial, linear and parallel to each other. They are also perpendicular to the base 27 of a groove 29 formed annularly within a first machine part, i.e. piston 31. The opposed vertical sidewalls 22 of the annular spring element 12 are radial and parallel to each other and perpendicular to base 27. Said sidewalls 22 are aligned or flush with the exterior surfaces 25 of said legs 19. The two linear sidewalls 33 of the machine groove 29 are likewise perpendicular to the groove base 27 and parallel to the exterior surfaces 25 of the sealing member legs 19 and to the vertical sidewalls 22 of spring element 12. Each exterior surface 25 terminates in a radial heel portion 35 at a location opposite the adjacent butt leg ends 21.

A central delta-shaped annulus 37 projects radially outwardly from the body 17 comprising outwardly converging sloped or bevelled surfaces 39, which merge to form an apex 41.

An annular shoulder 43, parallel to but spaced from the axis of the piston 31, is interposed between each sloped face 39 and the adjacent heel 35 to form a corner therebetween.

The sealing member 14 is intended to be highly wear resistant and wear compensating, i.e. to provide, under the urging of the spring element 12 a wear compensation feature which prevents leakage due to wear. The sealing member is preferably formed of a suitable synthetic resinous material such as polyurethane or polyester.

Figure 2:
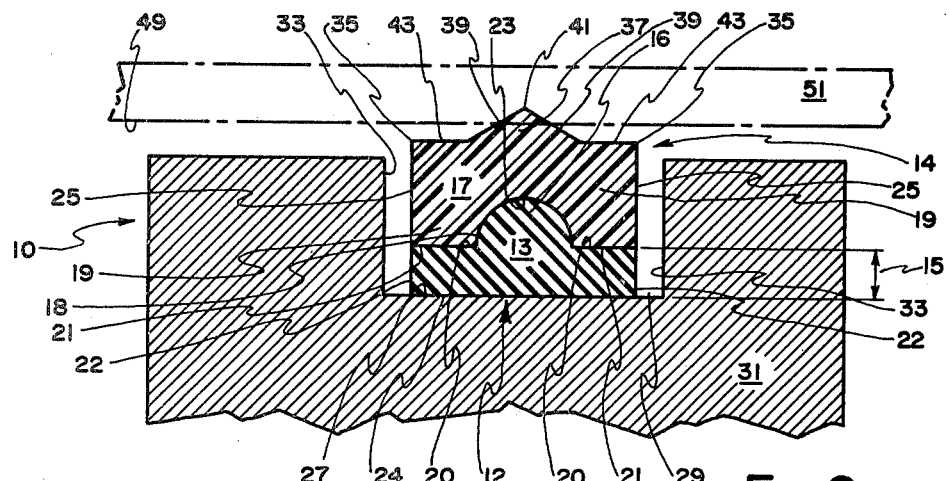
FIG. 2 is a cross-sectional view of the two element seal assembly of FIG. 1 placed within a groove of a piston shown as being removed from its cylinder.

From the foregoing, it is readily apparent that the sealing element 14 contiguously engages the adjacent annular surface area of the spring element 12. More specifically, the interior sides of the legs 19 contiguously straddle the tongue 16 and the base 21 of each leg 19 firmly abuts one shoulder 20. The described interface between the two elements 12 and 14 extends across the full width of two elements and defines a flex site which yieldingly resists force without fluid leakage. Therefore, the two element seal 10 functions unitarily though flexibly. In addition, the two element seal 10 is typically stretched over a piston 31 (FIG. 2) and into said groove 29. The piston 31 is conventional. In the position of FIG. 2, normally the composite seal 10 is substantially unstressed.

Once the state depicted in FIG. 2 is achieved, the piston 31, carrying the composite seal 10 in the groove 29, is placed within a second machine part, i.e. the barrel 49 of a cylinder 51. (See FIG. 3.) The seal 10 is formed so that the diameter of the annular apex 41 is greater than the inside diameter of the cylinder barrel 49. Accordingly, the composite seal 10 is caused to be placed in a radially compressive stressed state when positioned as illustrated in FIGS. 3 and 4. The radial compression urges the spring member 12 firmly against the base 27 of the groove 29 at site 53 covering a distance 55 which is the length of the base 24 of member 12. Since there is no relative movement of machine parts at site 53, site 53 is a static seal site (when the seal 10 is subjected to fluid pressure, as illustrated in FIG. 4). Fluid pressure displaces the entire composite seal 10 unitarily along the groove base 27 so that one leg 19 and one vertical sidewall 22 (those opposite the leg 19 and vertical sidewall 22 being subjected to fluid pressure) are caused to be contiguous with the adjacent groove wall 33 to form a composite anti-extrusion seal at site 57 which covers the entire adjacent groove radial surface 33. (See FIG. 4.) To achieve the above-described dynamic, static and anti-extrusion seal sites, the axial dimension of the groove 29 is preferably about ten percent (10%) greater than the axial dimension of the seal 10.

Again as is also best illustrated in FIG. 4, the heel 35 may project radially beyond the diameter of the piston 31 and is caused to bite into the corner of the piston at the radial outward end of groove wall 33 at said site 57. However, the shoulders 43 may be flush with or slightly within the machine groove 29, if desired.

In the radially compressed state, the apex 41 is slightly flattened to form a narrow ribbon, band or line seal site contact area 61 (FIG. 4). The axial distance of the site 61 is substantially less than the axial dimension of the composite seal 10. The resistant seal pressure developed along the narrow line, ribbon or band 61 is a very high pounds per square inch. As a result, the composite seal 10 is unitarily stable, highly resistant to deformation and extrusion, and prohibits fluid displacement across the seal 10. The seal 10 also provides surprising wear take up, low cost, ease of installation, and long life characteristics, as well as resistance to individual or collective seal failure. A plurality of dynamic seals or dynamic seal sites are avoided as are misorientation, twisting and extrusion of the composite seal 10. The seal is also resistant to high and low pressures, a wide range of temperatures, fluids and abrasion.

As illustrated in FIG. 5, the orientation of the seal 10 may be reversed with the sealing element 14 directed radially inwardly and it may be placed in a groove disposed in the outer one of two relatively movable parts (e.g. the cylinder wall) so as to engage and seal against the inner second relatively moving part (e.g. the piston) in the same fashion and with the same advantages as mentioned in conjunction with the embodiment of FIGS. 1 through 4.

The invention may be embodied in other specific forms without departing from the spirit or essential characteristics thereof. The present embodiments are therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A two element compression seal assembly comprising:

an endless relatively soft annular spring element of yieldable material with memory and having a solid generally rectangular cross-sectional configuration with an annular projection extending toward the other element, an annular shoulder being disposed on each side of the projection;

an endless annular sealing element comprising a body of relatively hard wear resistant synthetic resinous material having a generally U-shaped cross-sectional configuration with the base comprising the U thereof contiguously receiving said annular projection;

said sealing element further comprising spaced radially directed anti-extrusion legs, the length of said legs being substantially the same as the distance the annular projection extends into the U of the sealing element in mating fully contiguous relation, the sealing element further comprising annular shoulders on each side of the U each shoulder being fully contiguously engaged by the adjacent spring element shoulder, the interface between the two elements being fully contiguous and comprising a force resistant flex site across which fluid is prevented from flowing, the spring element extending a short distance radially beyond the legs to compressively engage and accommodate creation of a static seal against substantially the entire surface area of the base of a groove in a first machine part;

said sealing element further comprising a delta-shaped projection having a central apex extending radially away from said anti-extrusion legs and adapted to extend beyond said machine groove and compressively engage the surface of a second machine part causing said apex to be slightly flattened and to create a dynamic annular line seal along the entirety of the 360 degrees of said slightly flattened apex, the width of the line seal being substantially less than the width of either of the two elements.

2. A two element compression seal assembly according to claim 1 wherein an anti-extrusion seal is created between compressive engagement of the aligned exterior radial surfaces of one of said legs and the side of the spring element with a sidewall of said groove responsive to pressure imposed upon the opposite side of said seal assembly comprising the exterior radial surfaces of the other of said two legs and the other side of the side of the spring element.

3. A two element compression seal assembly according to claim 1 wherein said delta-shaped projection is interposed between two circumferential shoulders which extend beyond the limits of said groove.

4. A two element compression seal assembly according to claim 3 further comprising a heel connected to but disposed substantially perpendicular to each said shoulder.

5. A two element compression seal assembly according to claim 1 wherein said delta-shaped projection extends radially outwardly.

6. A two element compression seal assembly according to claim 1 wherein said delta-shaped projection extends inwardly.

7. A two element compression seal assembly comprising:

an endless relatively soft annular spring element of yieldable material with memory and comprising an annular tongue flanked by an annular flat shoulder on each side of the annular tongue and an annular flat base radially spaced from the tongue;

a one piece endless annular sealing element of relatively hard synthetic resinous material having a generally U-shaped cross-sectional configuration comprising (a) a pair of radially directed anti-extrusion legs fully contiguously straddling the annular tongue of the spring element and fully contiguously engaging the shoulder of the spring element and (b) an oppositely radially directed delta-shaped annular exposed dynamic sealing ridge comprising an apex and opposed bevelled surfaces sloped oppositely away from the apex.

* * * * *